(12) United States Patent
Shupak

(10) Patent No.: US 6,663,299 B1
(45) Date of Patent: Dec. 16, 2003

(54) UNIVERSAL MOUNTING FOR CAMERA AND FLASH ATTACHMENT UNITS

(76) Inventor: Robert Craig Shupak, P.O. Box 445, Greer, AZ (US) 85927

( * ) Notice: Subject to any disclaimer, the term of this patent is extended or adjusted under 35 U.S.C. 154(b) by 0 days.

(21) Appl. No.: 10/131,390

(22) Filed: Apr. 22, 2002

Related U.S. Application Data

(60) Provisional application No. 60/286,867, filed on Apr. 26, 2001.

(51) Int. Cl.[7] .......................... G03B 17/00; G03B 17/08
(52) U.S. Cl. ...................... 396/422; 396/424; 396/428; 396/28
(58) Field of Search ................................ 396/419, 422, 396/424, 428, 431, 25, 28

(56) References Cited

U.S. PATENT DOCUMENTS 3,575,098 A * 4/1971 Jones .......................... 396/422
6,061,522 A * 5/2000 Inoue et al. .................. 396/28

\* cited by examiner

*Primary Examiner*—Russell Adams
*Assistant Examiner*—Rochelle Blackman
(74) *Attorney, Agent, or Firm*—Gregory J. Nelson

(57) ABSTRACT

A universal camera and flash unit mount having a camera mounting plate to which a handle may be detachably connected. A camera mounting plate is adjustably carried on the mount. The end of the handle, as well as the mount having ball joint to which flash arms may be selectively attached and adjustable to a wide range of lighting positions.

8 Claims, 6 Drawing Sheets

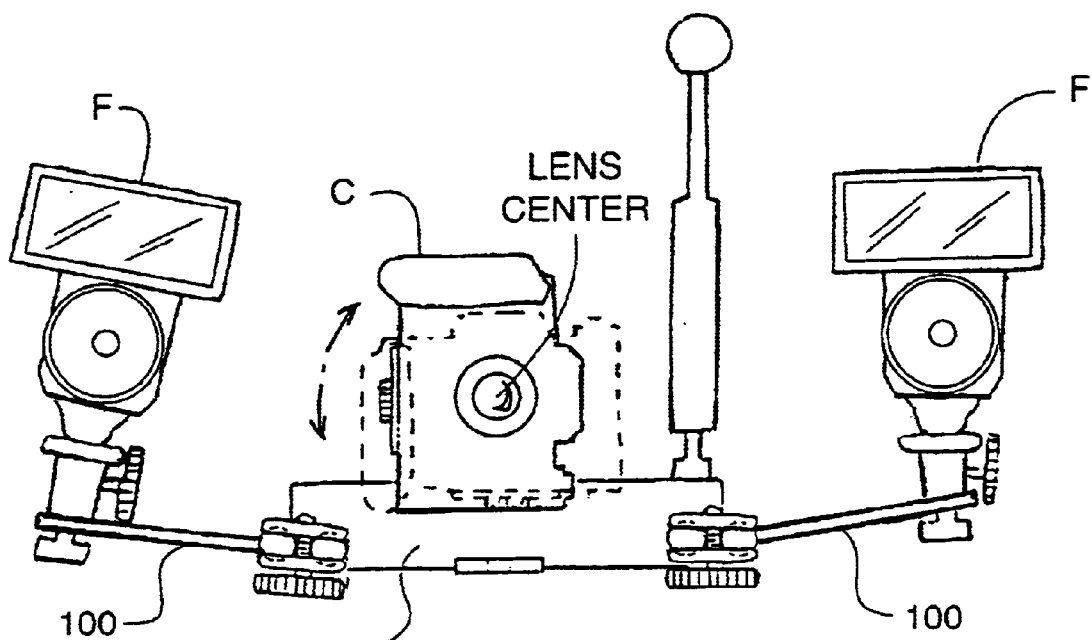
FIG. 4.
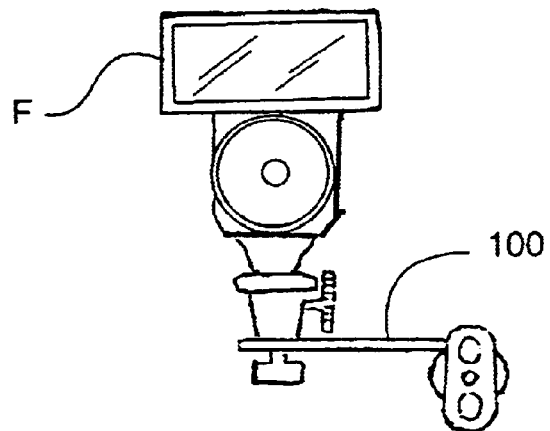
FIG. 5.
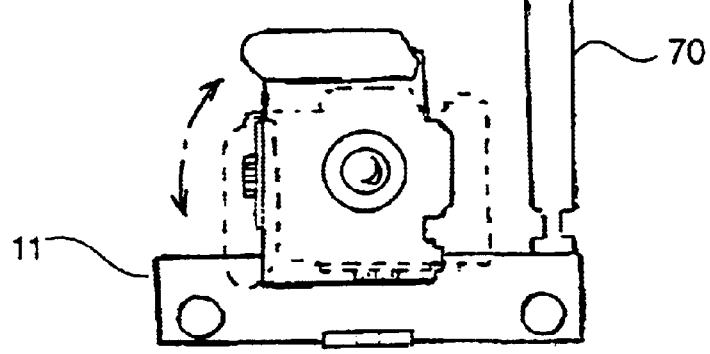

UNIVERSAL MOUNTING FOR CAMERA AND FLASH ATTACHMENT UNITS

This application is based on provisional patent application Ser. No. 60/286,867, filed Apr. 26, 2001, entitled "Universal Mounting for Camera and Flash Attachment Units".

FIELD OF THE INVENTION

The present invention relates to a photographic mounting device and more particularly relates to a mounting for a camera and flash attachment which is compact, lightweight and universal and may be mounted on a tripod or may be hand-held.

BACKGROUND OF THE INVENTION

The ideal camera mounting for securing camera and flash units when taking photographs should be compact, lightweight and versatile. The mounting should accommodate most 35 mm cameras and medium format cameras as well as shoe-mounted flashes. Such mounts should provide the capability of using the flash unit for wide area of lighting and support multiple flash units for variable ratio or flash fill lighting as well as for macro and portrait photography. An ideal camera mount should provide the ability to position the camera in either a vertical or horizontal format and maintaining the camera's lens in the same position regardless of orientation.

In the prior art there are numerous brackets for mounting cameras and flash units. Some allow the changing of formats with overhead wide-area lighting. Most are designed for specific camera models and do not provide the various desirable features mentioned above and are not universal allowing the user to mount various 35 mm medium format cameras.

The following patents show representative camera mounts:

U.S. Pat. No. 4,341,452: discloses a triaxial (dual biaxial) universal camera mount assembly which permits a camera secured thereto to be independently or simultaneously pivotable about three axes: a vertical axis, a horizontal axis, and a central lens axis. The universal camera mounting has a first yoke pivotally nested in a second yoke to form the horizontal axis. The second yoke is mountable to a tripod so that it may pivot about a vertical axis normal to, but offset behind, the horizontal axis. The second yoke has a pivotable universal camera mounting bracket, the pivot axis of which corresponds to the central lens axis and intersects both the vertical axis and the horizontal axis. The yokes are canted and the vertical and central axis pivots offset so that a camera is completely balanced in the mount. The pivots are specially constructed so that the balanced camera can be moved from one position to another, yet it will stay in the second position without need of a locking means. The mount replaces a conventional tripod pan head and permits angular movement of the camera to any position without changes in view or focus introduction of parallax errors as is the case with conventional tripod mounts.

U.S. Pat. No. 3,575,098 shows a flat normally horizontal, rectangular camera mounting base is supported manually by a single handle connected at its lower end to the outer end of a leftward extension of the base near the front end of the left edge of said base, said handle normally extending upright but being pivotally adjustable arm forwardly relative to said extension about a transverse horizontal axis. A flash unit supporting arm extends upwardly from the upper end of the handle at a slight inclination relative thereto to within a short distance of a vertical plane containing the optical axis of a camera mounted on said base. A short horizontal extension extends inwardly from the upper end of said arm, said extension being normal to said vertical plane and bisected thereby. A flash unit mounting screw is provided in said plane on said arm extension and secures to said extension a flasher unit support which is rockable about a horizontal axis normal to said plane.

A right-angled adapter bracket is optionally mountable on the base and pivotally supports an elevated right-angled auxiliary camera supporting platform whereby the latter with the camera fixed thereto may be rotated about the focal axis of the camera to any desired angle while taking a picture. To facilitate rapid assembly or disassembly on the camera mounting base of a camera or of the angular adapter bracket, an adapter slug is screwable onto each of the latter and is quickly engageable or disengageable by a novel spring biased clamp on the mounting base.

The base of the device has downwardly extending edge walls which, together with the lateral extension from the base for supporting the handle of the device, engage a flat surface on which the device is placed so as to support the device with the handle in upright position when placed on a table.

U. S. Pat. No. 4,241,988 describes a bracket for supporting cameras and electronic flash units in an arrangement for high quality photographic techniques. The bracket includes a member for supporting a camera, a pair of members for supporting electronic flash units, clamps for joining the several members together and appropriate threaded knobs and screw members for adjusting the bracket arrangement as well as mounting the electronic flash units and the camera thereon.

Despite the availability of camera mounts as described above there nevertheless exists a need for a versatile, compact and convenient mount.

SUMMARY OF THE INVENTION

Briefly the present invention provides a camera mount which has a body which carries a vertically adjustable camera mounting plate. The body may be rotated between vertical and horizontal positions or formats as well as intermediate angular positions. A handle is connected to one end of the body at a quick-release connection. The camera is secured to the mounting plate by means of a camera screw engageable in threads in the body of the camera as is conventional. At opposite ends of the body a ball extends forwardly supported on studs. The upper end of the handle also carries a similar ball. This allows one or more flash unit arms to be attached at multiple locations by means of an adjustable clamp. The clamp allows full range of positioning of the flash-unit arm. The outer or distal end of the flash-unit arm carries a conventional flash shoe mount which rotates and swivels to various flash unit positions on the flash arm.

The camera mount of the present invention may be secured on a tripod or may be manually held by gripping the handle. The mount provides ease of changing from horizontal to vertical format and will maintain the center of the camera's lens in the same position relative to the mount regardless of camera orientation as a result of the ability to adjust of the camera-mounting plate. Flash units can be attached and oriented for various formats including overhead, flash-filled variable lighting for scenes, portraits as well as macro photography. The device accommodates most 35 mm media format cameras and multiple-shoot mounted flash units. The mount can be made of suitable material such as stainless steel or other materials that are impervious to environmental conditions such as weather and may be used even in underwater environments with appropriate underwater cameras and submersible strobes.

BRIEF DESCRIPTION OF THE DRAWINGS

The above and other objects at an advantage of the present invention will be more fully appreciated and understood from the following description, claims and drawings in which:

FIG. 4 is a front view showing a camera mounted on the mounting plate in a vertical orientation and with two flash units secured to opposite ends of the plate;

FIG. 5 is front view of the mount showing another operational mode in which a flash attachment is secured to the upper end of the handle;

DETAILED DESCRIPTION OF THE DRAWING

Figure 1:
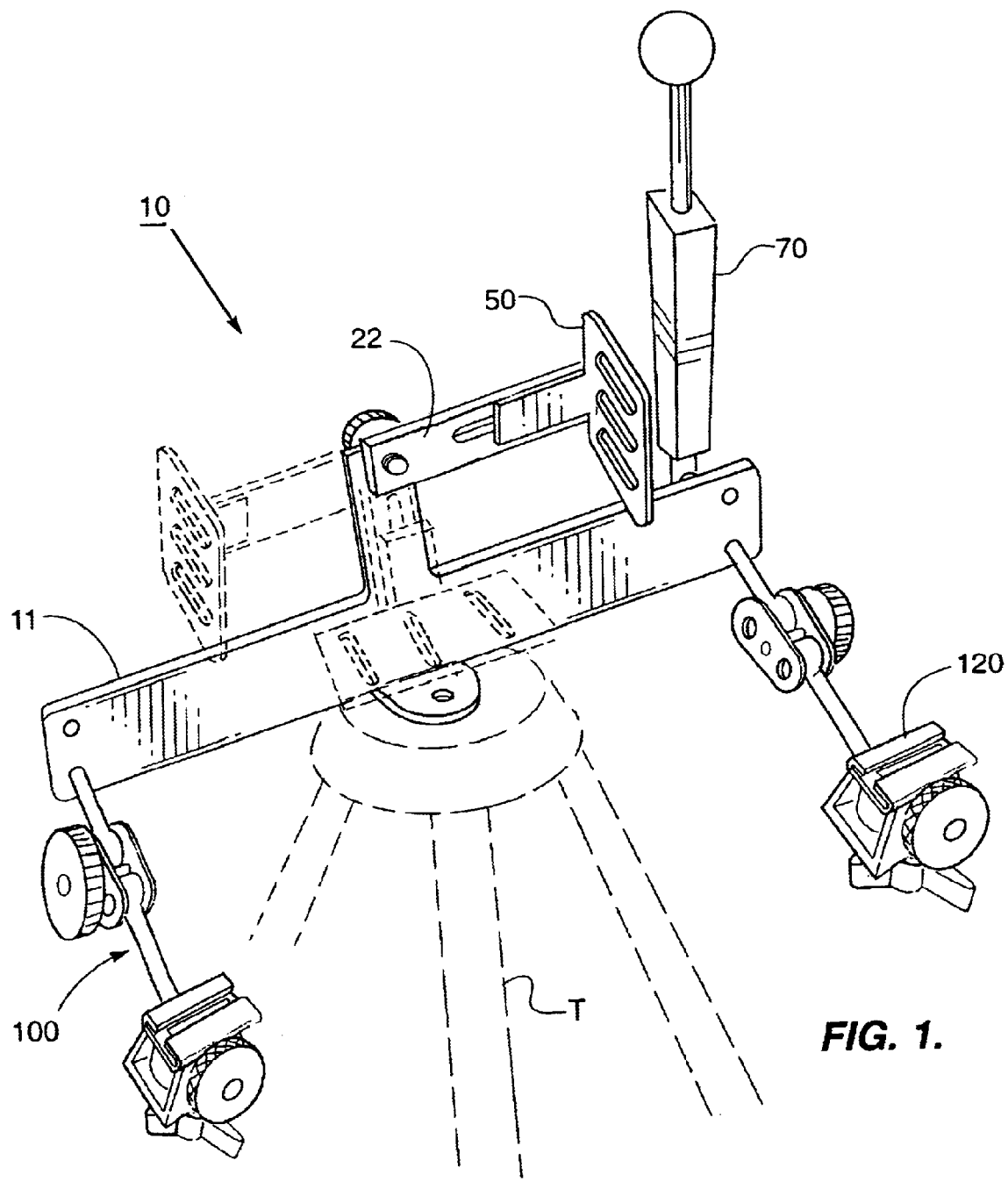
FIG. 1 is a perspective view showing the camera mount present invention used in connection with the tripod and showing the camera support plate in both the horizontal and vertical positions.
Figures 2, 3:
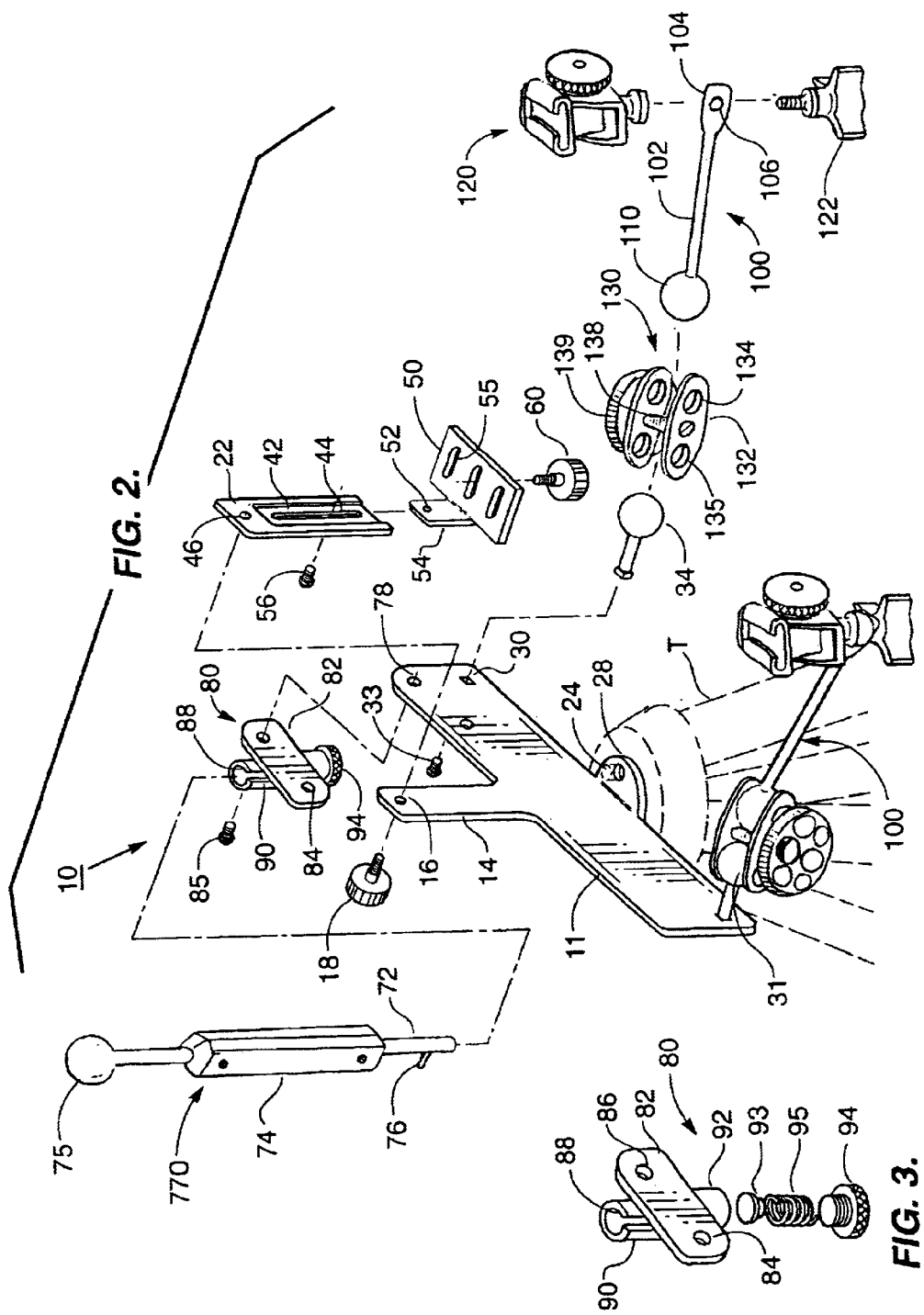
FIG. 2 is an exploded view similar to the perspective view of FIG. 1.
FIG. 3 is a detail of the handle receiving connector.

Turning now to the drawings particularly FIGS. 1 through 3, the camera-mount of the present invention is generally designated by the numeral 10 and has a body 11. The body 11 is fabricated from plate stock and may be plastic or metal and a preferred material is an environmentally resistant material such as steel or stainless steel. The body 11 is shown as being generally rectangular with an upwardly extending projection 14 at its approximate mid-point. The upper end of the projection defines a bore 16 for receipt of a screw 18 of which is securable to the camera body and may be tightened or loosened to secure camera mounting bracket extension 22 as will be explained hereafter. The body has a flange 24 extending from its bottom edge which also defines a bore 28 to allow the body to be secured by a suitable screw to a tripod "T" or other location. The tripod "T" forms no part of the invention.

The body defines one or more apertures 30 which are shown as a square being located adjacent the opposite vertical edges of the body. These apertures can be provided at other locations in the body and each may receive a ball joint component 32. The ball joint components are shown as having a spherical or ball end 34 and a projecting stud 36 with a square end which is receivable within the apertures 30. The ball joint components may be secured in place by a suitable fastener 33 extending into the stud from the rear of the body.

A camera mounting extension plate 22 is positioned at the center of the plate. The extension has a recess 42 extending in its front surface. A longitudinally extending slot 44 is provided in the bottom of the recess. An aperture 46 is provided in the upper end of the extension and is secured to the upper end of projection 14 on the body by means of threaded fastener 18. This allows the extension plate 22 to be selectively oriented either vertical position as shown in FIG. 1. The fastener 18 will secure the extension plate in the selected position.

The camera is positioned on a camera mounting bracket 50 which includes a generally planar base with a flange 52 extending from the rear edge of the base. The flange defines an aperture 54. The flange is slidable receivable within the recess 42 in the front surface of the extension plate 22. A fastener 56 adjustably attaches the camera mounting bracket 50 to the extension plate. One or more elongated slot 55 are provided in the camera mounting bracket to allow a camera mounting screw 60 to extend through a selected slot and into the internally threaded bore provided on most camera bodies. The multiple slots facilitate lateral adjustment of the camera body relative to the bracket 50.

A detachable handle 70 may be secured to the base. The handle 70 has an elongated rod 72 with a grip 74 secured at an intermediate location along the rod. The grip is configured to be comfortably grasped within the hand of the user. The upper end of the rod extends beyond the grip and terminates at a ball 75. The lower or distal end of the rod has a projecting pin 76 disposed at generally right angles with respect to the rod. The lower end of the rod is receivable within a handle connector 80 which is secured to the rear or back side of the body at a suitable location generally disposed toward one side. The connector is shown in detail in FIG. 3. Multiple mounting holes 78 can be provided in the body so that the user may mount the handle bracket at a suitable location for the convenience of the user. A right-handed person may select a particular mounted position for the handle while a left-handed person may select another.

The handle bracket 80 connector has a plate 82 having holes 84 for receiving fasteners 85 for securing the handle connector to the mount body. A receiver tube 88 is secured to the plate generally of vertical orientation. The tube defines a vertically extending slot 90 in the side wall terminating at its lower end at a notch 92 defining generally overall J-shaped slot configuration. The lower end of the tube is threaded and receives a cap 94. A small piston 93 is slidable in the tube and engages a stop within a tube to limit its upward trend. A spring 95 applies an upwardly biasing force against a piston 96. Thus, it will be apparent that the lower end of the handle may be inserted into the tube with the pin 76 aligned with the slot 90 in the tube. A downward manual force applied to the handle will compress spring 95. The handle is advanced until the pin on the lower end of the rod is aligned with notch 92 in the lower end of slot which will then allow the user to then twist the handle locking it in place as the pin engages the locking notch 92. Reversing the procedure will allow the handle to be removed for storage or in the event the user does not require the use of one handle.

Once significant advantage of the present invention is that it allows great versatility in the positioning of flash units. Flash units are each secured to the body by a flash unit arm. 100. The flash unit arms each include a longitudinal rod 102 which terminates at a flattened section 104 which defines a through bore 106. The opposite end of the arm carries a spherical ball 110. A conventional flash shoe mount 120 may be secured to the outer distal end of the flash arms by a lock knob 122. By loosening the knob, the flash mounts may be rotated. Similarly, conventional flash shoes 120 allow rotation of the mount and attached flash unit.

The flash arms 100 may be attached to any of the selected balls 32, 75 either on the mount body or on the handle. The flash arms are each attached by means of a clamp 130 which consists of a pair of plates 132, 134 each having a pair of spaced-apart semi-spherical indentations 135 on their inner surface which correspond to the curvature of the balls. The plates are connected by a threaded member 138 which has a knob 139 at its outer end. The ball 110 on the end of the flash arm may be positioned between opposed spherical indentations with the opposed semi-spherical indentations being positioned over one of the selected balls 30 on the body. The locking knob 139 is then tightened to lock the flash arm 100 and its attached shoe in the desired position. By loosening the adjustment knob the arms may be moved through a full range of motion.

The advantages and features of the present invention will be better understood from the following description of operation. A photographer wishing to use the mount may position it on a tripod "T" as shown in FIG. 1 by attaching the flange 24 on the bottom side of the body to the tripod. A camera "C" is positioned on the camera mounting plate by means of screw 60 engaging its threaded bore in the camera body. The lateral position of the camera may be adjusted by selection of one of the slots 58. The photographer may then position the camera desired vertical or horizontal position and adjust the camera relate to the body by sliding extension 22 within its receiving slot 41. The desired number of flash arms 100 are attached to selected of the balls 34, 75. The handle 76 is locked in place to the body. The flash units may be oriented as shown in FIG. 4 on opposite sides of the camera with the camera in a vertical position. If the photographer wishes to place the camera in a horizontal position, this can be accomplished by loosening the locking screw 56 and pivoting the camera to a horizontal position and then relocking the extension plate. The vertical adjustment provided by the camera plate 50 will allow the photographer to position the center of the lens at the same elevation as with the camera in the vertical position.

Figure 7:
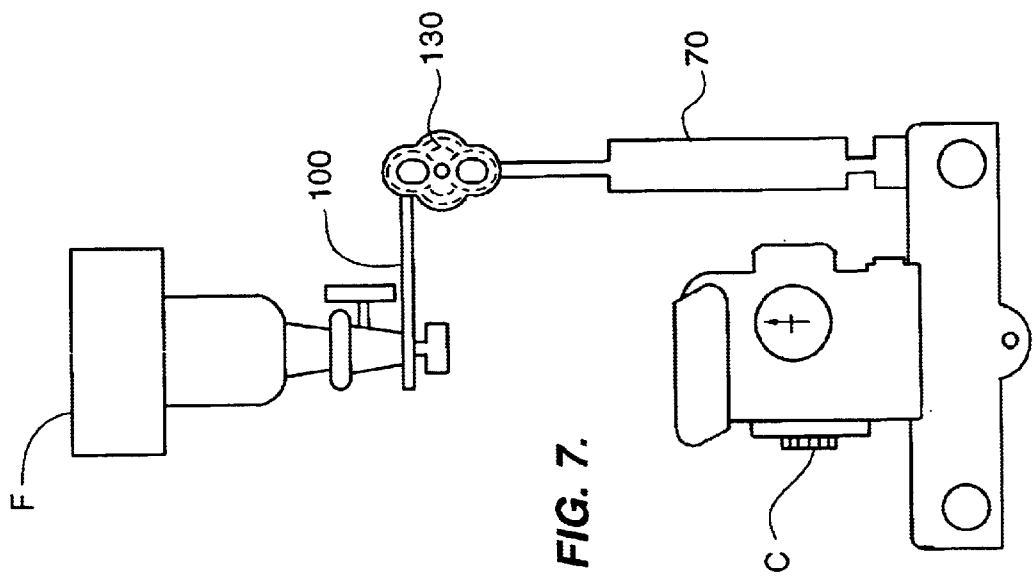
FIGS. 6 and 7 show the mount supporting a camera and flash for overhead lighting.
Figure 6:
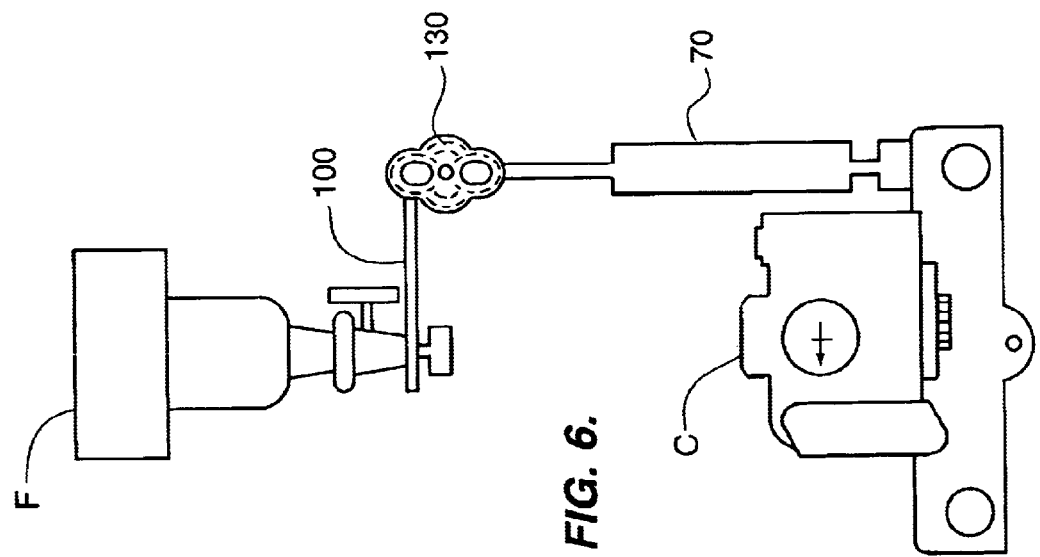

The flash unit may be directed upwardly or toward a reflector for portrait and similar shots as shown in FIG. 6. The photographer may also use an angular position between the vertical (FIG. 7) and horizontal orientation (FIG. 6). Similarly, flash units can be disposed at a number of locations depending on the type of photographs to be taken. Multiple flash units may be used. Flashes may be used for fill lighting or macro or portrait photography.

Figure 8:
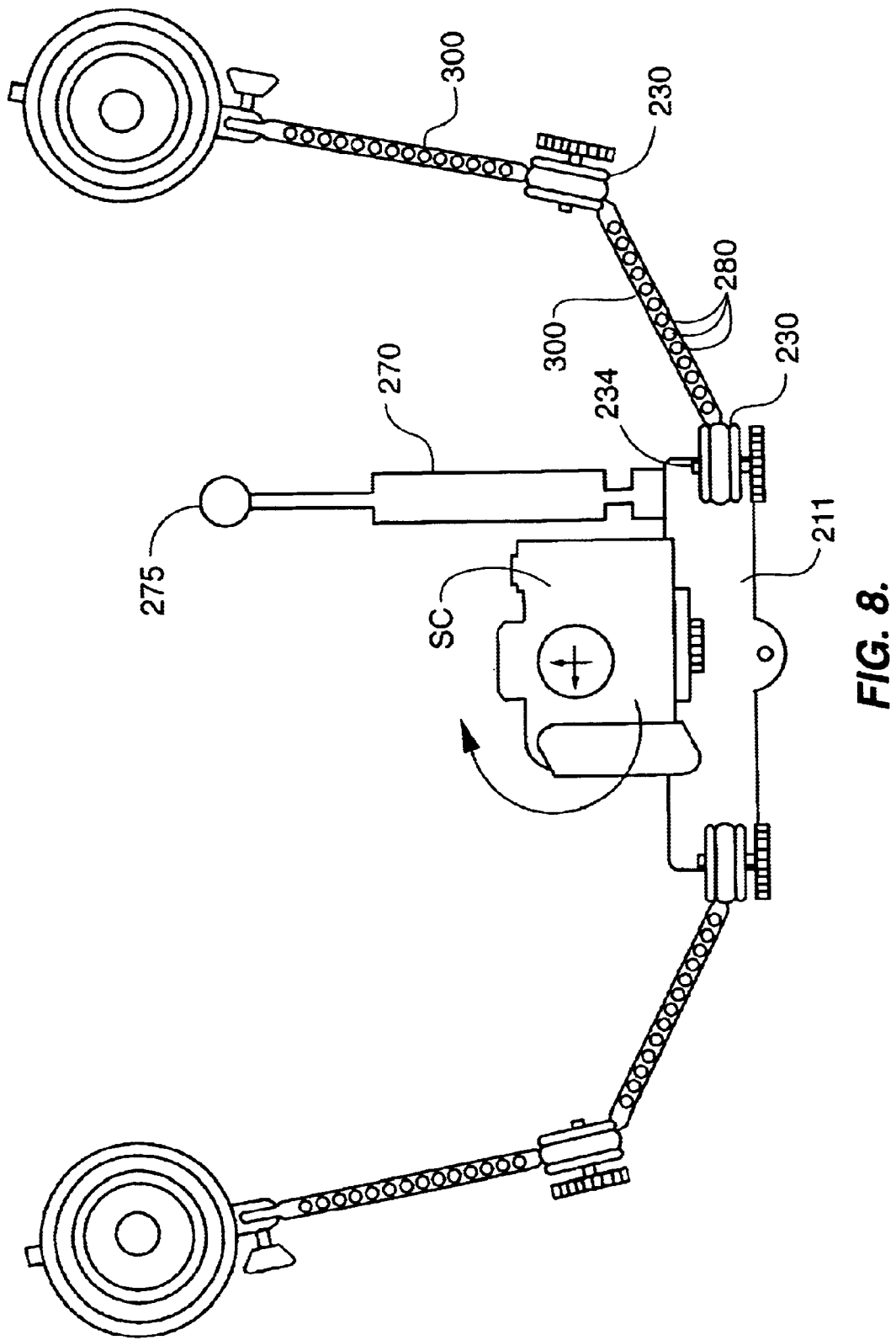
FIG. 8 is a front view showing an embodiment of the mount adapted for use with underwater strobes and a submersible camera.

In FIG. 8 an embodiment 200 of the camera mount is shown with the handle attached and with an underwater strobe and submersible camera SC secured to the bracket. The mount has a body 211 which has balls 234 for attachment of one or more flash arm 300 by brackets 230. The mount components are all of a salt water resistance material such as stainless and may be provided with relief holes 280 for reduced weight. Thus, the underwater photographer can guide and orient the camera and flash by use of the handle 270. In this use mode, the mounting is hand-held and not secured to stabilization units such as a tripod.

Figure 9:
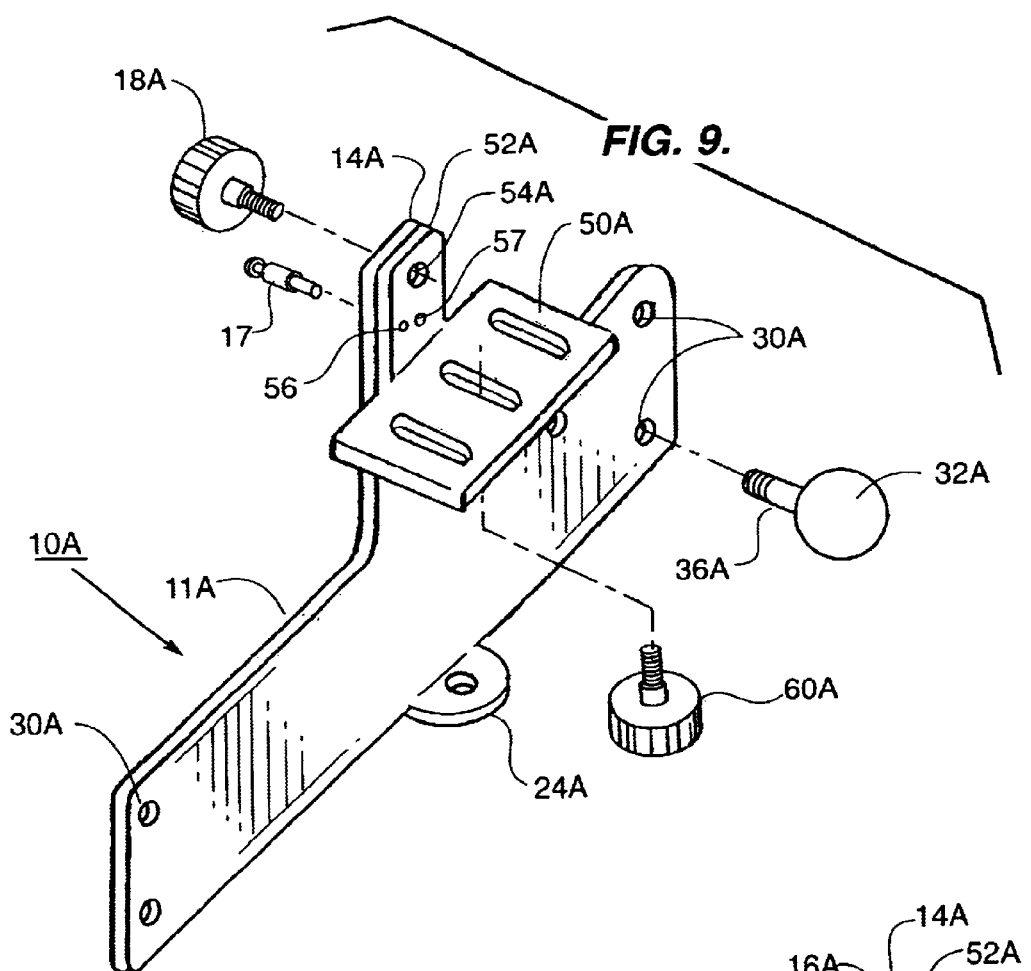
FIGS. 9 and 9A illustrate another embodiment of the camera mount of the present invention.
Figure 9A:
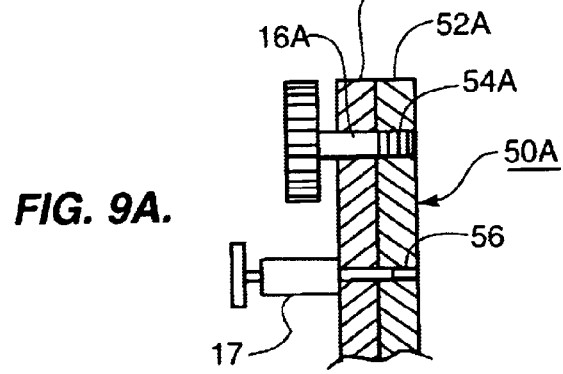

In FIGS. 9 and 9A, the mount is designated 10A having a body 11A having a flange 24A for attachment to a tripod or other location. The body 11A has multiple apertures 30A to receive the shaft 36A of a ball joint component 32A. A ball joint component may be secured to the body at one or more selected apertures.

Body 11A has an upwardly extending projection 14A which defines a bore 16A. A camera is positioned on L-shaped camera bracket 50A having a flange 52A with a threaded bore 54A. A pivot knob 18A with a threaded shaft extends through bore 16A into bore 54A. A quick release, spring-loaded detent pin 17 is mounted on the rear of flange 14A engageable with selected bores 56 and 57. Thus, the bracket 50A can be positioned either vertically or horizontally by loosening knob 18A, manually releasing detent pin 17 and selectively positioning the bracket. Once positioned, the detent pin seats in the selected bore and the knob tightened. The camera is secured to the bracket by camera mounting screw 60A.

Thus, from foregoing seen that the present intervention provides a highly versatile bracket for mounting a camera and flash. It will be obvious to those skilled in the art to make various changes, alterations and modifications to the invention described herein. To the extent such changes, alterations and modifications do not depart from the spirit and scope of the appended claims. They are intended to be encompassed therein.

I claim:

1. A camera and flash mounting comprising:
   (a) a mounting plate having a front surface and defining at least one aperture;
   (b) a camera mounting plate adjustably carried on said mounting plate;
   (c) a handle connector on said mounting plate;
   (d) a handle having a grip and a first ball at one end and detachably securable to said handle connector;
   (e) a second ball securable to said mounting plate at said aperture and projecting from said front surface;
   (f) a flash arm having opposite ends with a flash attachment securable at one end and having a third ball at the other; and
   (g) clamping means for adjustably attaching said flash arm third ball to at least a selected one of said first or second balls.

2. The camera and flash mounting of claim 1 wherein said mounting plate, handle and flash arm are weather and moisture resistant.

3. The camera and flash mounting of claim 1 wherein said handle grip is located at an intermediate location on said handle.

4. The camera and flash mounting of claim 1 wherein said camera mounting plate is adjustably positionable between horizontal and vertical positions by quick release means.

5. A camera and flash mounting comprising:
   (a) a mounting plate having opposite sides, top and bottom edges, and front and rear surfaces and defining at least one aperture, said plate having a projection extending therefrom and mounting means for securing said plate to a tripod;
   (b) a bracket extension plate pivotally secured to said projection;
   (c) a generally L-shaped camera mounting plate adjustably secured to said bracket extension plate;
   (d) means for securing a camera to said camera mounting plate whereby the position and orientation of the camera maybe selectively adjusted;
   (e) a handle connector on said mounting plate;
   (f) a handle having a grip, first ball at one end and a rod end attachably securable to said handle connector;
   (g) a second ball securable to said plate at said aperture and projecting from said front surface;
   (h) a flash arm having opposite ends with one end adapted to receive a flash attachment and the other end having a ball thereon; and
   (i) clamping means for adjustably securing said flash arm to a selected of said first or second balls.

6. The camera and flash mounting of claim 5 wherein said mounting plate, handle and flash arm are weather and moisture resistant.

7. The camera and flash mounting of claim 5 wherein said handle grip is located at an intermediate location on said handle.

8. The camera and flash mounting of claim 5 wherein said camera mounting plate is adjustably positionable between horizontal and vertical positions by quick release means.

* * * * *